April 3, 1934.  L. C. CURRIER  1,953,155
DEVICE FOR TESTING PAPER
Filed Dec. 19, 1931
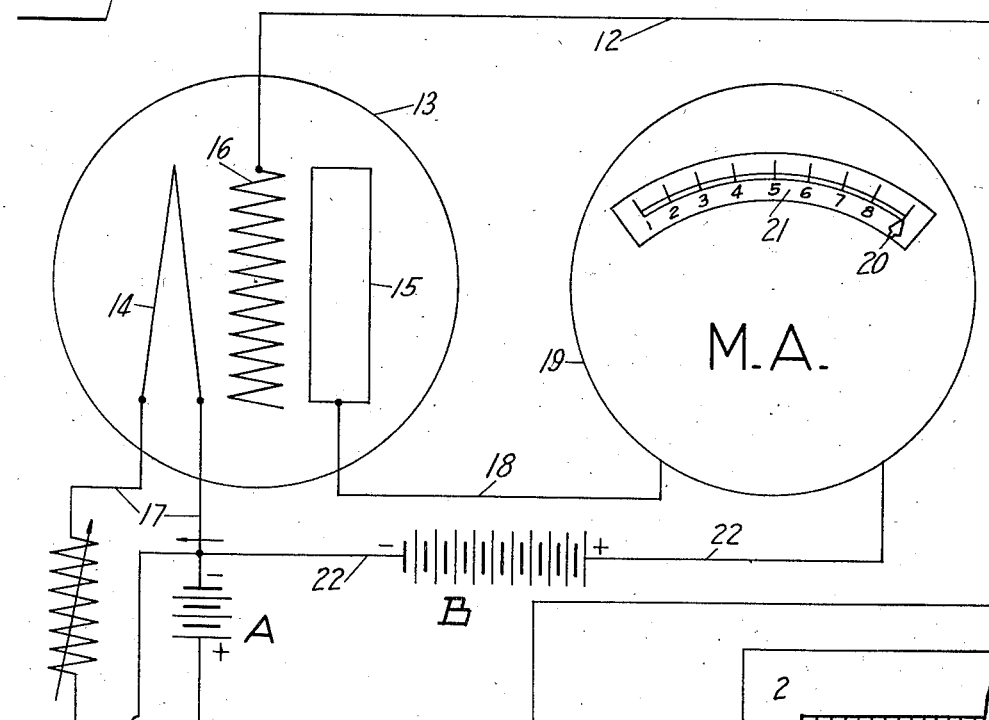
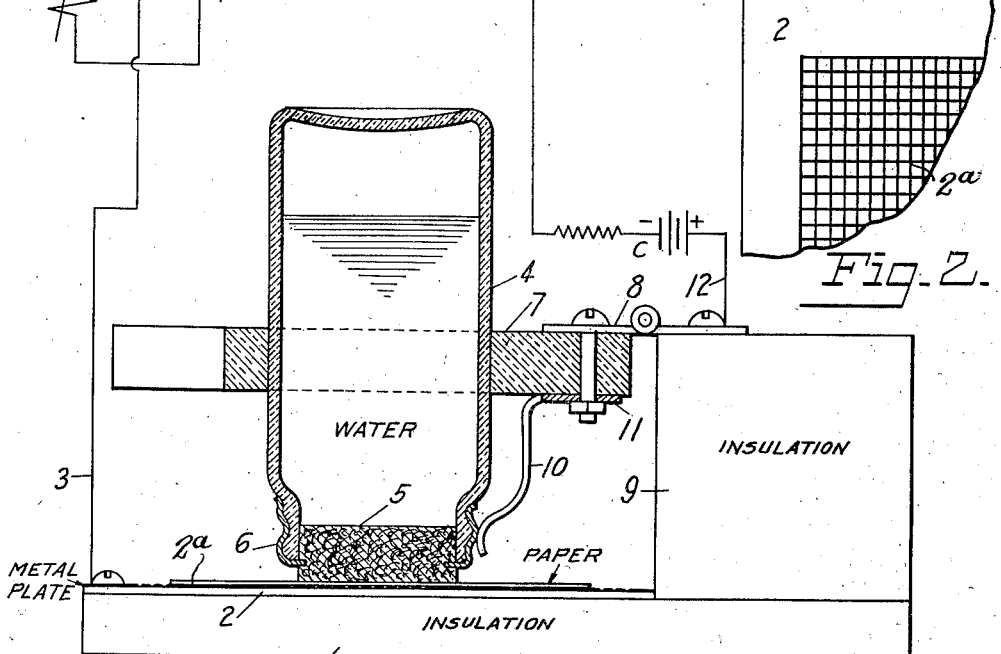
INVENTOR.
LESLIE C. CURRIER.
by
his ATTORNEY.

Patented Apr. 3, 1934

1,953,155

UNITED STATES PATENT OFFICE 1,953,155

DEVICE FOR TESTING PAPER

Leslie C. Currier, Middletown, Ohio, assignor to The Sorg Paper Company, Middletown, Ohio, a corporation of Ohio Application December 19, 1931, Serial No. 582,094

16 Claims. (Cl. 175—183)

This invention relates to a device for testing paper and is designed more particularly for testing sized paper to determine the waterproof characteristics thereof. In the use of sized paper for many purposes it is important that the sizing should be uniform and should be sufficient to impart a definite waterproof characteristic to the paper. Frequent tests are therefore made by the manufacturer and/or user to determine the sufficiency of the sizing. Ordinarily these tests are made by floating a piece of the paper on a solution of ink and acetic acid and noting the length of time required for the ink to penetrate the paper. This method of testing is crude and unsatisfactory because, among other reasons, it does not give uniform results and two individuals separately testing the same paper will not secure the same results. It has also been proposed to test the paper by inserting the same between two bodies of a liquid electrolite connected in circuit with an indicator and noting the time required for the electrolite to penetrate the paper and thus close the circuit. This method requires the use of a chemical electrolite, the action of which differs from the action of water or ordinary moisture, and the arrangement is such that it is difficult to secure a satisfactory test.

One object of the invention is to provide a paper testing device which will be simple in its construction and accurate in operation.

A further object of the invention is to provide a testing device of such a character that the paper to be tested may be quickly and easily inserted in and removed from the same.

A further object of the invention is to provide such a testing device in which the moisture will be applied to one side only of the paper under test.

A further object of the invention is to provide such a testing device connected in circuit with an electrically operated indicator and an amplifying device whereby a very small current will be sufficient for the operation of the device.

Other objects of the invention will appear as the apparatus is described in detail.

In the accompanying drawing Fig. 1 is a diagrammatic view of the device with the moisture applying device in section; and Fig. 2 is a plan view of a portion of the support for the paper.

In this drawing I have illustrated one embodiment of my invention but it will be understood that this particular embodiment has been chosen for the purpose of illustration only and that the apparatus may take various forms without departing from the spirit of the invention.

The particular apparatus here illustrated comprises a supporting structure having a conductor on which the paper to be tested is supported. In the construction shown the supporting structure comprises a horizontal base portion 1 having mounted thereon a plate 2 of conducting material, such as metal, and this plate is insulated from the base, preferably by forming the base of insulating material. The conducting plate 2 is connected with a conductor 3 forming part of an indicator circuit. Associated with the supporting structure is a moisture applying device adapted to be moved into and out of contact with the upper surface of the paper which is supported upon the conductor plate 2. Preferably this moisture applying device comprises a pad of absorbent material which is saturated with water, or other suitable liquid, and placed upon the upper surface of the paper. As here shown, the moisture applying device as a whole comprises a container 4 for liquid having an opening in the lower part thereof, which opening is closed by a pad 5 of absorbent material. The container may conveniently consist of a small jar having a metal cap 6 provided with an opening in which the pad 5 is supported, the outer portion of the pad projecting beyond the cap. In this manner the saturation of the pad is maintained constant and uniform. The closure pad may be moved into and out of contact with the paper in any suitable manner but preferably the container is movably mounted upon the supporting structure. In the present instance, the container is mounted in a member 7 which is pivotally mounted on a part of the supporting structure and is preferably connected by a hinge 8 with a block 9 of insulating material mounted on the base 1. An electrical contact member 10 is carried by the pivoted member 7 and is electrically connected with the hinge 8, as by a bolt 11. This contact member bears against the metal cap 6 of the container and thus establishes electrical connection between the moisture saturated pad 5 and the hinge 8 and this hinge is connected with a conductor 12 forming part of the indicator circuit. When the pad is brought into engagement with the paper the indicator circuit will remain open between the pad 5 and the conductor plate 2, until the moisture has penetrated the paper and thus established an electrical connection between the pad and the conductor, thereby closing the indicator circuit and causing the indicator to be actuated. By noting the time required for the moisture to penetrate the paper and to impart a predetermined movement to the indicator the character of the sizing, that is, the waterproof quality of the paper, can be determined.

Some types of paper, when dry, are non-conductors of electricity. Other types of paper have conducting qualities and will permit the passage of more or less electricity, even when dry. When the device is used for testing a non-conducting paper the latter may be supported in direct contact with the conductor plate, but when testing a conducting paper it is necessary that the paper should be insulated from the conductor plate until the moisture has penetrated the same. For this purpose I have, in the present device, provided the supporting surface of the conductor plate with insulation of such a character that it will support the dry paper out of contact with the plate but will permit the current to pass from the paper to the plate when the moisture has penetrated the paper. Preferably a thin layer of perforated or grill-like insulation 2a is superimposed upon the conductor plate and this insulation may consist of a layer of enamel, portions of which have been cut away or scraped off to expose corresponding portions of the conductor plate. The insulation, although very thin, will support the dry paper out of contact with the conductor plate as the openings through the insulation are sufficiently small to prevent the paper from sagging and thus coming in contact with the plate. When the moisture has penetrated the paper it will quickly find its way through one or more of the perforations in the thin layer of the insulation and thus establish an electrical connection between the moist paper and the conductor plate, or in some cases it may happen that the moistening of the paper will cause a sufficient expansion of the same to cause the moist paper to enter perforations in the insulation and thereby make direct contact with the conductor plate.

The electrical indicator may be of any suitable character and may be connected with the indicator and with the conductor plate and the moisture applying device in various ways but in order that a very small amount of current will be required for the operation of the apparatus I prefer to include an amplifying device in circuit with the indicator. In the arrangement here shown, the amplifying device comprises an audion tube 13 having a filament 14, a plate 15 and a grid 16. The filament is connected by a circuit 17 with a battery A. The plate 15 is connected by a conductor 18 with one terminal of the electrically operated indicator 19, which is preferably a milliammeter having a pointer 20 which travels over a scale 21. The other terminal of the indicator is connected by a conductor 22 with the filament circuit and a battery B is interposed in this conductor. The conductor 3 which is connected with the conductor plate 2 of the paper support is also connected with the conductor 22. The conductor 12 which is connected with the moisture applying device is connected with the grid 16 and a battery C is interposed in this conductor.

In the operation of the apparatus the pivotally supported container is swung about its axis to a substantially horizontal position above the supporting block 9, in which position it will be retained by gravity. While in this position the electrical connection between the conductors 3 and 12 is, of course, broken and the plate current will actuate the milliammeter in accordance with the value of that current. As here shown, the needle indicates the maximum flow of current in the plate circuit. The paper is placed upon the supporting plate 2 and the container moved downwardly to bring the absorbent closure 5 into engagement with the upper surface of the paper. The connection between the conductors 3 and 12 will not be established until the moisture has penetrated the paper. As soon as this takes place the plate circuit will be connected through the conductors 3 and 12 with the grid, thus reducing the current flow from the filament to the plate and causing the needle of the milliammeter to drop back. By noting the time required for the moisture to penetrate the paper and to cause the pointer of the milliammeter to move to a predetermined "stop point", for example the indication 4, the character of the sizing may be accurately determined.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a paper testing apparatus, a normally dry support for paper to be tested comprising a conductor adapted to have electrical connection with one side of the paper on said support, means for applying moisture to the other side of said paper, an electrically operated indicating device connected in circuit with said conductor and said moisture applying means, and a source of current connected in said circuit.

2. In a paper testing apparatus, a support for paper to be tested comprising a conductor adapted to have electrical connection with one side of the paper on said support, and an absorbent pad movable into and out of contact with the other side of said paper, an electrically operated indicating device connected in circuit with said conductor and said pad, and a source of current connected in said circuit.

3. In a paper testing apparatus, a normally dry support for the paper to be tested comprising a conductor adapted to have electrical connection with one side of the paper on said support, a moisture applying device movable into and out of contact with the other side of said paper, an electrically operated indicating device connected in circuit with said conductor and said moisture applying device, and a source of current connected in said circuit.

4. In a paper testing apparatus, a support for the paper to be tested comprising a conductor adapted to have electrical connection with one side of the paper on said support, a container for liquid having a restricted outlet movable into and out of a position to apply liquid to the other side of the paper on said support, an electrically operated indicating device connected in circuit with said conductor and the liquid in said container, and a source of current connected in said circuit.

5. In a paper testing apparatus, a support for the paper to be tested comprising a conductor adapted to have electrical connection with one side of the paper on said support, a container for liquid having an outlet and a closure of absorbent material for said outlet, said container being movable to enable said closure to be moved into and out of engagement with the other side of the paper on said support, an electrically operated indicating device connected in circuit with said conductor and with said closure, and a source of current connected in said circuit.

6. In a paper testing apparatus, a support for paper to be tested comprising a conductor adapted to have electrical connection with one side of the paper on said support, a container for liquid having an outlet and a closure of absorbent material for said outlet, a pivoted support for said container so arranged that said closure may be moved into and out of contact with the other side of the paper on said support, an electrically operated indicating device connected in circuit with said conductor and with said closure, and a source of current connected in said circuit.

7. In a paper testing apparatus, a supporting structure comprising an insulated plate of conducting material adapted to support the paper to be tested, a container for liquid having an outlet and a closure of absorbent material for said outlet, movable means for so mounting said container on said supporting structure that said closure may be moved into and out of contact with the upper side of the paper on said plate, an electrically operated indicating device connected in circuit with said plate and said absorbent closure, and a source of current connected in said circuit.

8. In a paper testing apparatus, a supporting structure comprising an insulated plate of conducting material adapted to support the paper to be tested, a conductor for liquid having an outlet at the lower end thereof and a closure of absorbent material for said outlet, pivoted means for actuating said container to move said closure into and out of contact with the upper side of the paper on said plate, an electrically operated indicating device connected in circuit with said plate and said closure, and a source of current in said circuit.

9. In a paper testing apparatus, a support for the paper to be tested comprising a conductor adapted to have electrical connection with one side of the paper on said support, a container for liquid having an opening at one end thereof, a closure for said opening comprising a metal cap, and a pad of absorbent material carried by said cap, and a movable member on which said container is mounted with said closure lowermost, an electrical contact member carried by said movable member and engaging said cap, an electrically operated indicating device connected with said conductor and said contact member, and a source of current in circuit with said indicator.

10. In a paper testing apparatus, a support for paper to be tested comprising a conductor adapted to have electrical connection with one side of the paper on said support, means for insulating said paper from said conductor when the paper is dry and permitting the passage of moisture from said paper to said conductor, means for applying moisture to the other side of said paper, an electrically operated indicating device connected in circuit with said conductor and said moisture applying means, and a source of current connected with said circuit.

11. In a paper testing apparatus, a support for paper to be tested comprising a conductor adapted to have electrical connection with one side of the paper on said support, a layer of insulating material interposed between said paper and said conductor and having openings through which moisture may pass from said paper to said conductor, means for applying moisture to the other side of said paper, an electrically operated indicating device connected in circuit with said conductor and said moisture applying means, and a source of current connected in said circuit.

12. In a paper testing device, a structure to support the paper to be tested, and comprising a plate of conducting material, insulation superimposed on said plate, said insulation being arranged to support said paper out of contact with said plate and to permit the passage of moisture from said paper to said plate, a movable device for applying moisture to that side of said paper opposite said plate, an electrically operated indicating device connected in circuit with said plate and said moisture applying device, and a source of current connected in said circuit.

13. In a paper testing device, a structure to support the paper to be tested and comprising a plate of conducting material, a perforated layer of insulation superimposed on said conductor plate and with which one side of said paper is in contact, a movable device for applying moisture to that side of said paper opposite said insulation, an electrically operated indicating device connected in circuit with said plate and said moisture applying device, and a source of current connected in said circuit.

14. In a paper testing apparatus, a normally dry device to engage one side of the paper to be tested and comprising a conductor adapted to have electrical connection with the paper, a device for applying moisture to the other side of said paper, one of said devices being movable into and out of operative relation to the paper, an electrically operated indicating device connected in circuit with said conductor and said moisture applying device, and a source of current connected in said circuit.

15. In a paper testing apparatus, a normally dry device to engage one side of the paper to be tested, and comprising a conductor adapted to have electrical connection with the paper, a device comprising an absorbent pad to engage and apply moisture to the other side of said paper, one of said devices constituting a support for said paper and the other of said devices being movable into and out of engagement with said paper, an electrically operated indicating device connected in circuit with said conductor and said moisture applying device, and a source of current connected in said circuit.

16. In a paper testing apparatus, a normally dry device to engage one side of the paper to be tested and comprising a conductor adapted to have electrical connection with the paper, means for insulating said paper from said conductor when the paper is dry and for permitting the passage of moisture from said paper to said conductor, a device for applying moisture to the other side of said paper, one of said devices being movable into and out of operative relation to the paper, an electrically operated indicating device connected in circuit with said conductor and said moisture applying device, and a source of current connected in said circuit.

LESLIE C. CURRIER.